United States Patent [19]

Johnson

[11] 4,351,321
[45] Sep. 28, 1982

[54] SOLAR COLLECTOR PANEL

[76] Inventor: Ben E. Johnson, 1321 S. Main, Carthage, Mo. 64836

[21] Appl. No.: 203,115

[22] Filed: Nov. 3, 1980

[51] Int. Cl.³ .............................................. F24J 3/02
[52] U.S. Cl. .................................. 126/446; 126/450; 126/448
[58] Field of Search ............... 126/432, 445, 446, 450, 126/448; 165/171

[56] References Cited

U.S. PATENT DOCUMENTS

| | | | |
|---|---|---|---|
| 1,125,113 | 1/1915 | Junkers | 165/171 |
| 1,802,635 | 4/1931 | Eaton | 126/447 |
| 3,464,402 | 9/1969 | Collura | 126/447 |
| 4,027,652 | 6/1977 | Collura | 126/446 |
| 4,064,866 | 12/1977 | Knight, Jr. | 126/447 |
| 4,069,811 | 1/1978 | Tabor | 126/447 |
| 4,080,703 | 3/1978 | Beck, Jr. | 126/447 |
| 4,116,220 | 9/1978 | Burd | 126/432 |

FOREIGN PATENT DOCUMENTS 2733899  2/1979  Fed. Rep. of Germany ...... 126/446

*Primary Examiner*—James C. Yeung
*Attorney, Agent, or Firm*—Litman, Day and McMahon

[57] ABSTRACT

A solar collector panel is provided which has a pair of integral hook portions disposed along the longitudinal edges of the panel for corresponding contact with each pipe of a pair of adjacent solar collector pipes of a normal side-by-side solar collector pipe array. Adjacent hook members of adjacent panels cooperate to generally encompass, in a heat transfer relationship, a common pipe of successive adjacent pairs of pipes. Spring-biased fasteners attach the end panels to the main frame of the solar collector unit with the spring bias transmitted across the plurality of adjacent panels so as to introduce balancing forces to the cooperating hook members for clenching the common pipe therebetween as well as providing a solar collector panel/pipe array suspended from the main frame.

9 Claims, 5 Drawing Figures

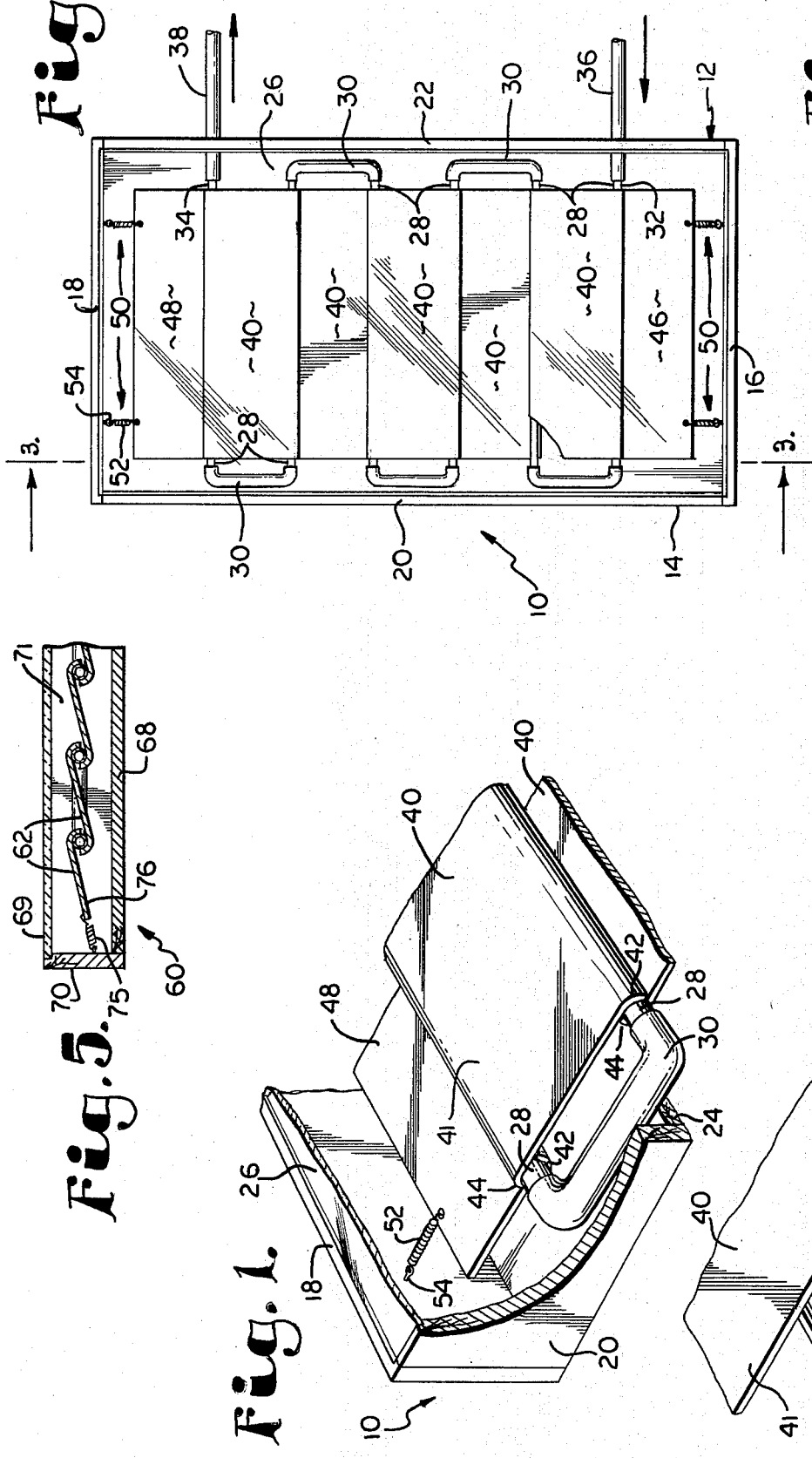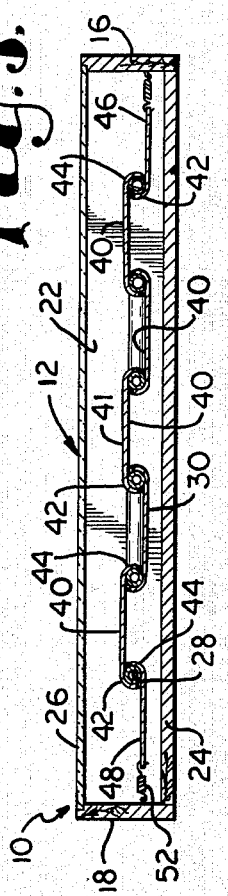

SOLAR COLLECTOR PANEL

BACKGROUND OF THE INVENTION

This invention relates to a solar collector unit and more particularly to solar panels respectively designed for retaining a pair of solar collector pipes in a heat transfer relationship therewith and cooperating with a plurality of other solar panels to provide a unit having a suspended solar collector panel/collector pipe array.

The general use of flat plate solar collector panels for the absorption of solar radiation and subsequent transfer to solar collector pipes conveying a heat absorbent fluid therethrough is known. Accordingly, attention has been directed to effective means of placing the solar collector plates in a heat transfer relationship with the collector pipes as well as with each other so as to present a functional and cost effective solar collector unit.

The use of soldering, welding and brazing techniques to interconnect the various components into the panel/pipe array have been relatively expensive, complex and labor intensive, thus, the cost of the resulting solar collector units is relatively high. In addition, constructions utilizing welding or the like are not easily disassemblied for storage or transfer to a different location. Therefore, prior art devices have more or less successfully been drawn to mechanical or fixed connectors to provide for placement of the panels and pipes in the desired heat transfer and structural relationships.

SUMMARY OF THE INVENTION

The present invention provides a solar collector unit having a plurality of adjacent solar collector panels, each panel designed to hold a pair of adjacent solar collector pipes used for conveying the solar fluid therethrough in a heat transfer relationship therewith. The individual panels, generally rectangular in configuration, have integral curved side portions, presenting hook-type members which are formed along the long edges of the panel which contiguously contacts in a heat transfer relationship, a portion of the exterior surface of the solar collector pipe along the length thereof. Curved side portions of adjacent panels cooperate so as to generally encompass the exterior surface of a common pipe of the successive adjacent pairs of pipes associated with the respective panels. A frame member provides structural support to the unit surrounding the solar collector pipe/panel array. Attachment of the initial and terminal panels to the endwalls of the frame member by spring biased fasteners introduces tensile forces along the adjacent panels such that balancing forces are applied to the integral curved portions whereby the respective common collector pipe is clenched by the cooperating curved portions and thereby presents a collector pipe/panel array suspended from the frame member. The curved portions of each plate may, in combination with the central portion of each plate, either present a C-shaped or S-shaped configuration as viewed from the end thereof.

OBJECTS OF THE INVENTION

It is therefore a general object of this invention to provide a solar collector unit employing solar collector panels designed for use in conjunction with solar collector pipes for the purpose of heat transfer therebetween.

Another general object of this invention is to provide a solar collector unit utilizing solar panels, as aforesaid, which suspend the solar collector pipes from a main frame of the solar collector unit.

Still another object of this invention is to provide a solar collector panel, as aforesaid, which can be placed in a heat transfer relationship with the solar collector pipes without requiring the use of any permanent or separate mechanical connectors therebetween.

A further object of this invention is to provide a solar collector unit having a solar collector pipe/panel array suspended from the main frame so as to minimize the heat transfer between the frame member and suspended array.

A particular object of this invention is to provide a solar panel, as aforesaid, having a pair of integral hook-type members thereon with each member designed to contact in a heat transfer relationship a respective solar collector pipe of an adjacent pair of solar collector pipes associated therewith.

Another particular object of this invention is to provide a solar panel having hook members, as aforesaid, which cooperate with adjacent hook members of adjacently disposed panels so as to generally encompass a solar collector pipe common to successive pairs of adjacent pipes.

Still a further particular object of this invention is to provide spring biased fasteners for joining to the main frame adjacent solar panels with the spring bias introducing balancing forces to the cooperating hook members so as to clinch the common solar collector pipe therebetween.

Still another particular object of this invention is to provide spring biased fasteners, as aforesaid, which suspend the solar collector panel/pipe array from the main frame.

Another object of this invention is to provide a solar collector unit utilizing solar panels, as aforesaid, which diminishes the effects of expansion and contraction of the structural materials as induced by temperature changes therein.

Another object of this invention is to provide a solar collector unit which is easy to assemble and disassemble from a portable kit assembly; does not require any complex fabricating or assembly techniques; and is thus easily transportable between sites.

Other objects and advantages of this invention will become apparent from the following description taken in connection with the accompanying drawings, wherein are set forth by way of illustration and example certain embodiments of this invention.

The drawings constitute a part of this specification and include exemplary embodiments of the present invention and illustrate various objects and features thereof.

BRIEF DESCRIPTION OF THE DRAWINGS

FIG. 1 is a fragmentary perspective view of a solar collector unit according to the present invention showing cooperation between adjacent solar collector panels with an initial or terminal pair of solar collector pipes and the joining of the initial or terminal panels to a main frame of the solar collector unit.

FIG. 2 is a top plan view of the solar collector unit showing the solar collector panel/pipe array suspended within the main frame of the solar collector unit.

FIG. 3 is a cross sectional view of the solar collector unit, taken along line 3—3 in FIG. 2, showing clinching cooperation between adjacent panels thereof with associated common pipes between the adjacent panels as well as the spring bias fasteners used in suspending the panel/pipe array from the main frame.

FIG. 4 is a fragmentary and partly exploded view of the solar collector unit, on an enlarged scale, showing the disposition of adjacent hook members of adjacent panels on opposite sides of the common solar collector pipe prior to clenching contact therewith.

FIG. 5 is a partial cross-sectional view of a modified solar collector unit showing the use of solar panels having an alternative S-shaped configuration.

DETAILED DESCRIPTION OF THE PREFERRED EMBODIMENTS

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring more particularly to the drawings, a solar collector unit 10, as shown in FIG. 2, comprises a generally rectangular housing 12 having main frame member 14 as provided by a pair of longitudinally spaced-apart endwalls 16 and 18 and laterally spaced-apart sidewalls 20 and 22. An insulated back wall 24 is positioned along the bottom of the main frame member 14 with a transparent pane 26 placed atop the main frame member 14 allowing the solar radiation to pass therethrough. The walls 16, 18, 20 and 22 may be composed of or covered with an insulated material if so desired.

A plurality of longitudinally spaced-apart collector pipes, generally designated as 28, are positioned within the housing 12 and are shown as being serially fluid-connected by flexible coupling members 30 located at alternate opposite ends of successive pairs of adjacent pipes from the initial pipe 32 to the terminal pipe 34 of the array of solar collector pipes 28. An inlet duct 36 in flow communication with the initial pipe 32 introduces the solar fluid therein and an outlet duct 38 directs the solar heated fluid from the discharge end of the terminal pipe 34 of the array of pipes 28 for conveyance to the remainder of the solar heating system (not shown).

A solar collector panel 40, made of a heat absorbent material is associated, in a heat transfer relationship, with each successive pair of adjacent pipes 28 of the solar pipe array. As shown, each panel 40 has a generally planar central surface portion 41 which is generally rectangular in configuration with opposed edges of each intermediate panel 40 which is in communication with one of the pipes 28 being curved to present a pair of longitudinally spaced-apart integral hook like members 42 and 44 facing toward each other so as to present an elongated C-shaped end view configuration to the panels 40, as can be seen in FIG. 3. Each integral hook like member 42 and 44 engages, in a heat transfer relationship, a portion of the exterior surface of each solar collector pipe 28 along the length thereof. Accordingly, the curvature of the hook member 42 and 44 should preferentially follow that of the solar collector pipe 28 to provide an optimum conductive relationship therewith. As shown in the drawings, immediately adjacent hook portions 42 and 44 of adjacent panels 40 cooperate one with each other in contact about radially opposite portions of the common collector pipe 28 in order to generally encompass the common collector pipe 28 in a heat-transfer relationship therewith. As shown, the panels 40 are positioned in an alternating over and under relationship relative to the successive pairs of adjacent solar collector pipes 28 so as to provide for the cooperating engagement.

As shown in FIGS. 1, 2 and 3, the initial 46 and terminal 48 solar panels need only engage the initial 32 and terminal 34 pipes of the array of pipes 28 respectively. These panels 46 and 48 are also respectively fastened to the adjacent endwalls 16 and 18 of the main frame 14 by spring biased fasteners 50 having a rigid fastener member, such as support hook 54, and a spring-biased member, such as spring 52, therein, as shown in FIG. 2. Upon the fastening of the springs 52 between associated end panels 46 and 48 and associated endwalls 16 and 18 respectively with all intermediate panels 40 cooperating to support associated pipes 28 by engagement therewith, the springs 52 are in a state of tension. This tension is transmitted along the adjacent panels 46, 40 and 48 through the respective hook members 42 and 44 so as to introduce opposite balancing forces to the cooperating and associated hook members 42 and 44 which clench each common collector pipe therebetween. Accordingly, the plurality of adjacent collector panels 40 with common collector pipes 28 clenched therebetween present a collector panel/pipe array suspended from the main frame member 14 by the respective spring fasteners 50 so as not to engage the main frame member 14 except through the springs 52.

In the assembly of a solar collector unit 10 incorporating the above described collector panels 40, two or more support hooks 54 are first attached to the interior side of one endwall 16 of the main frame 14. These hooks 54 are selected to be able to rigidly support the spatially adjacent initial collector panel 46 independently or may have the springs 52 incorporated therein. The initial collector panel 46, having only one integral hook portion 42 is attached to the supporting hook 54 or alternatively, the spring 52 near a side thereof opposite the associated hook portion 42. An initial solar collector pipe 32 is then placed and centered in the hook portion 42 of this initial panel 46. A full collector panel 40 is then placed with the hook portion 44 covering the exposed portion of the previously installed and common pipe 32. C-shaped panels 40 are then placed in an over and under relationship relative to the succeeding pairs of pipes 28 generally so that the hook members 42 and 44 generally encompass in a heat transfer relationship the common pipe of successive pairs of adjacent pipes 28. The terminal panel 48 is similar in structure to the initial panel 46 with the hook member 44 covering the terminal solar collector pipe 34 of the collector pipe array. This terminal panel 48 is then fastened to the adjacent endwall 18 of the main frame 14 with one or more tensioned springs 50. It is foreseen that that the springs 50 may be utilized on one or both ends of the array of panels 40.

The width of either the initial panel 46 or the terminal panel 48 may be varied in order to achieve good tension across the assembled collector pipe/panel array. This tension produces the connecting and clenching interface between each pair of the cooperating associated hook members 42 and 44 and the collector pipe 28 associated therewith. In this manner, balancing forces are provided which act on the pipe 28 and are transmitted through the opposed cooperating hook members 42 and 44.

The collector pipes, although shown as being serially fluid connected may also be fluid connected in parallel by the use of input and output manifolds (not shown).

After the last step of the above described assembly, the transparent panel 26 is attached to the main frame so as to allow the solar rays to enter the housing 12 for entrapment thereon so as to heat the solar panels 40. The panels 40 being in a heat transfer relationship with the associated pair of collector pipes 28, thus heat these pipes 28 and solar fluid passing therethrough.

An alternative embodiment of a solar collector unit 60 according to the present invention is partly shown in FIG. 5. The collector unit 60 is in other ways similar to the collector unit 10 except for the configuration of panels 62 associated with the former. In particular, the panels 62 have an S-type configuration so that the engagement thereof with an associated pair of collector pipes 64 is an over/under relationship and is used with similar advantages and results as above described. The collector unit 60 includes a housing 64 with shown bottom 68, top 69, and sides 70 and 71. A spring 75 connects an end plate 76 to the side 70.

It is to be understood that while certain forms of this invention have been illustrated and described, it is not to be limited thereto, except insofar as such limitations are included in the following claims.

Having thus described the invention, what is claimed as new and desired to be secured by Letters Patent is:

1. In a solar collector unit having a frame assembly for supporting at least three spaced and generally parallel solar collector pipes used in conveying a solar heat absorbent fluid therethrough, the improvement comprising:
   (a) a heat absorbent panel positioned in a heat transfer relationship between each associated pair of adjacent pipes of said collector pipes and forming a panel array; each of said panels being non-integral with said pipes and with each of the other panels;
   (b) a pair of hook members on each panel; each hook member contacting in a heat transfer relationship a portion of a respective pipe of said associated pair of pipes; adjacent hook members of adjacent panels cooperating with each other to wrap around opposite sides of a common one of said associated pair of pipes in clamping relationship; said panels including first and second end panels respectively positioned on opposite sides of said panel array; and
   (c) spring tensioning means having a biasing position connecting between said first and second of said end panels and said frame and producing forces along said panels generally perpendicular to said pipes so as to provide a clenching interface between said cooperating hook members of adjacent panels and said common collector pipe, whereby said solar collector pipes are urged into a suspended relationship relative to said frame; said biasing means being selectively removable from said spring tensioning position such that the hook members of adjacent panels are not held in clenching interface with each other and each of said panels is easily disengaged from the remaining panels and from said pipes.

2. The apparatus according to claim 1 wherein:
   (a) said hook members are configured to generally conform to a portion of said respective pipe so as to provide a contiguous heat transfer relationship therebetween.

3. The apparatus according to claim 1 or 2 wherein:
   (a) each hook member is an integral portion of said panel and is heat conductive so as to form a heat conductive relationship between said panel and said associated pipe.

4. The apparatus according to claim 1 or 2 wherein:
   (a) each hook member contacts approximately one-half of the exterior surface of said pipe whereby said cooperating hook members generally encompass said common pipe clenched therebetween.

5. The apparatus according to claim 1 wherein:
   (a) said panels are generally C-shaped in configuration with said hook members positioned at opposite ends of said panel; and
   (b) said panels are placed in an alternating over and under relationship relative to successive pairs of said pipes whereby said cooperating hook members contact generally diametrically opposite portions of said common pipe to balance said forces acting on said common pipe and thereby maintain said clenching interface and suspend said pipes.

6. The apparatus according to claim 1 wherein:
   (a) said panels are generally S-shaped in configuration with said hook members positioned at opposite ends of said panel; and
   (b) hook members of each panel alternatively engaging lower and upper portions of said associated pipes with each respective cooperating hook member of adjacent panels contacting the opposite portion of said common pipe to balance said forces acting on said common pipe and thereby maintain said clenching interface.

7. The apparatus according to claim 1 wherein:
   (a) said spring tensioning means are tensiled springs for drawing said panels taut between opposite ends of said frame;
   (b) at least two of said springs resiliently connect each one of said end panels to said frame assembly; and
   (c) said tensile spring action introduces forces across said panels to said cooperating hook members to provide for said clenching interface.

8. The apparatus according to claim 1 wherein:
   (a) each panel adjacent opposite ends of said frame member is an end panel extending between said frame member and a solar collector pipe adjacent thereto with said frame adjacent pipe being contacted by a hook member associated with said end panel for cooperation with a hook member of an adjacent panel to provide for said clenching interface by said cooperating hook members of said frame adjacent pipe.

9. A kit for a solar collection unit comprising:
   (a) an enclosed frame structure having a light transparent side;
   (b) a plurality of pipes for carrying heat transfer media and adapted for being aligned in a generally parallel sequence in said structure;
   (c) a plurality of panels; each of said panels being sized to be positioned between a respective pair of adjacent pipes and having hook members on opposite ends thereof for engaging the adjacent pipes associated therewith; adjacent plates being adapted to engage a common pipe in an over and under relationship respectively; and
   (d) a pair of end panels having one hook member associated therewith and being adapted for engaging a common pipe between each end panel and a respective adjacent panel;

(e) biasing means including at least one spring member; said biasing means securing said end panels to said frame structure when interconnected between said frame structure and said end panels such that said panels are suspended under tension within said frame structure and said biasing means being selectively disconnectible from said frame structure and said end panels to relieve tension on said panels and allow easy removal of said panels from each other and from said pipes.

* * * * *